United States Patent [19]

Jeppe

[11] Patent Number: 5,613,589
[45] Date of Patent: Mar. 25, 1997

[54] FRICTION CLUTCH FOR A MOTOR VEHICLE

[75] Inventor: Harald Jeppe, Schweinfurt, Germany

[73] Assignee: Fichtel & Sachs AG, Schweinfurt, Germany

[21] Appl. No.: 360,455

[22] Filed: Dec. 21, 1994

[30] Foreign Application Priority Data

Dec. 23, 1993 [DE] Germany .................. 43 44 124.6

[51] Int. Cl.⁶ .................................................. F16D 13/64
[52] U.S. Cl. ...................... 192/204; 192/213.12; 464/68
[58] Field of Search ................... 192/204, 212, 192/213.12, 110 B; 464/66, 68

[56] References Cited

U.S. PATENT DOCUMENTS 5,016,744  5/1991  Fischer et al. ............... 192/204
5,064,041  11/1991 Graton et al. ............. 464/68 X
5,230,415  7/1993  Ament et al. ............... 192/204

FOREIGN PATENT DOCUMENTS

| 0382197 | 8/1990 | European Pat. Off. . |
| 070626 | 3/1954 | United Kingdom . |
| 1235699 | 6/1971 | United Kingdom . |
| 2242254 | 9/1991 | United Kingdom . |
| 2258515 | 2/1993 | United Kingdom . |

*Primary Examiner*—Richard M. Lorence
*Attorney, Agent, or Firm*—Nils H. Ljungman and Associates

[57] ABSTRACT

A clutch disc with a bearing element on the inside diameter of the one cover plate. The bearing element has a rectangular cross section and is fixed by means of its one axial end surface to guide areas of the cover plate which extend radially.

20 Claims, 10 Drawing Sheets

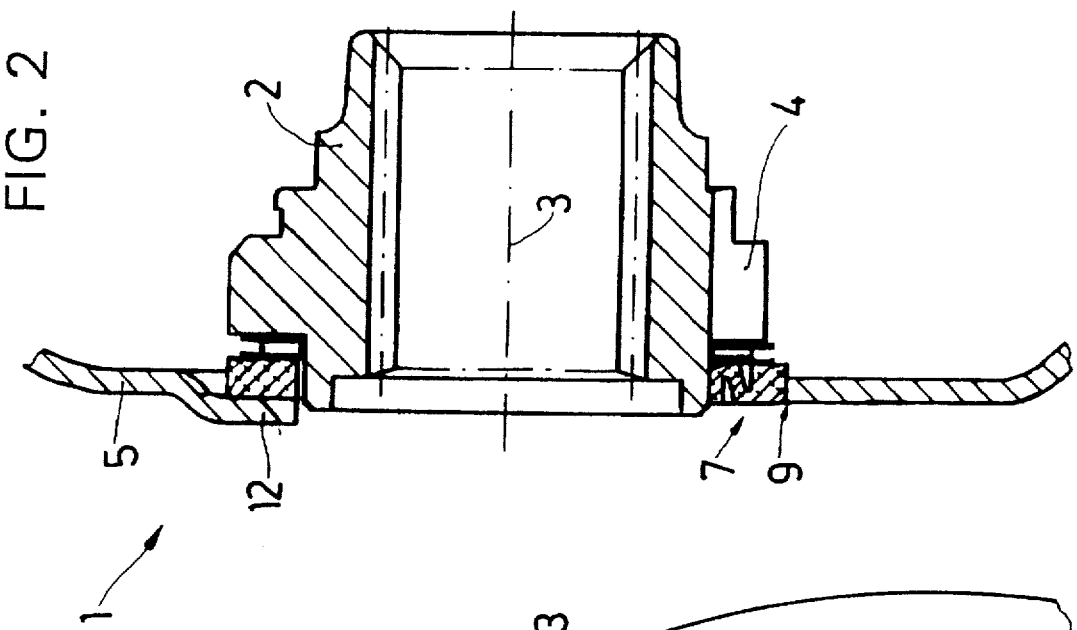
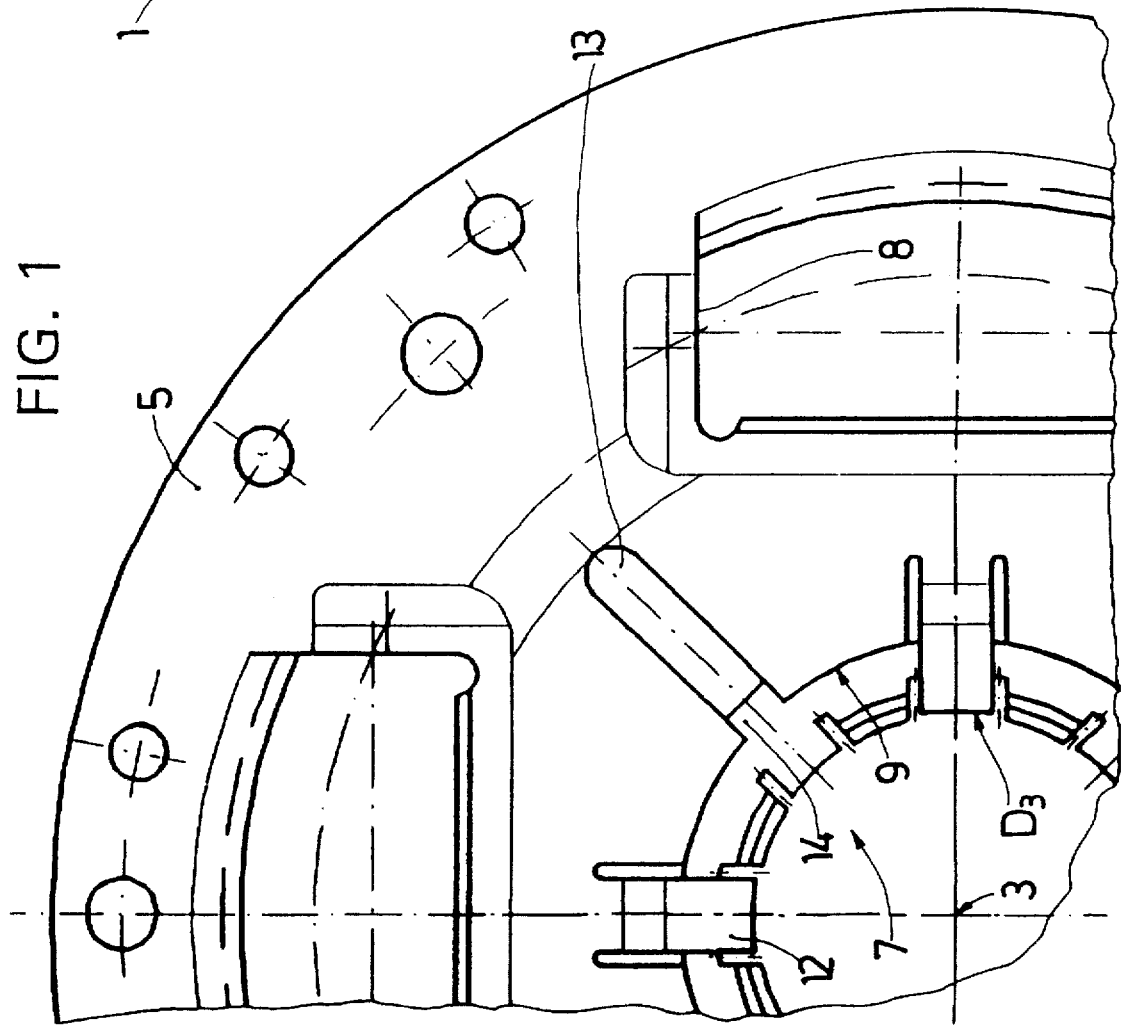

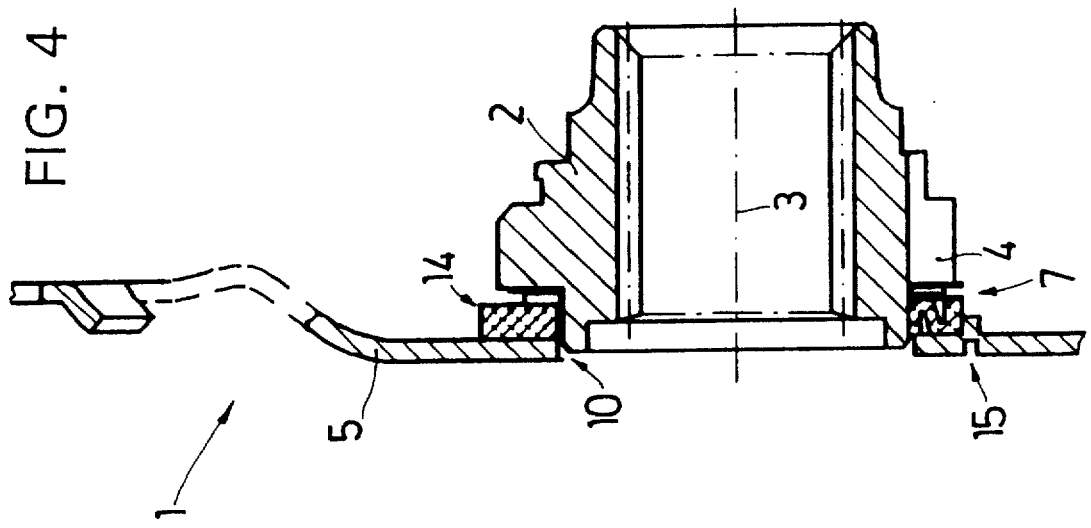
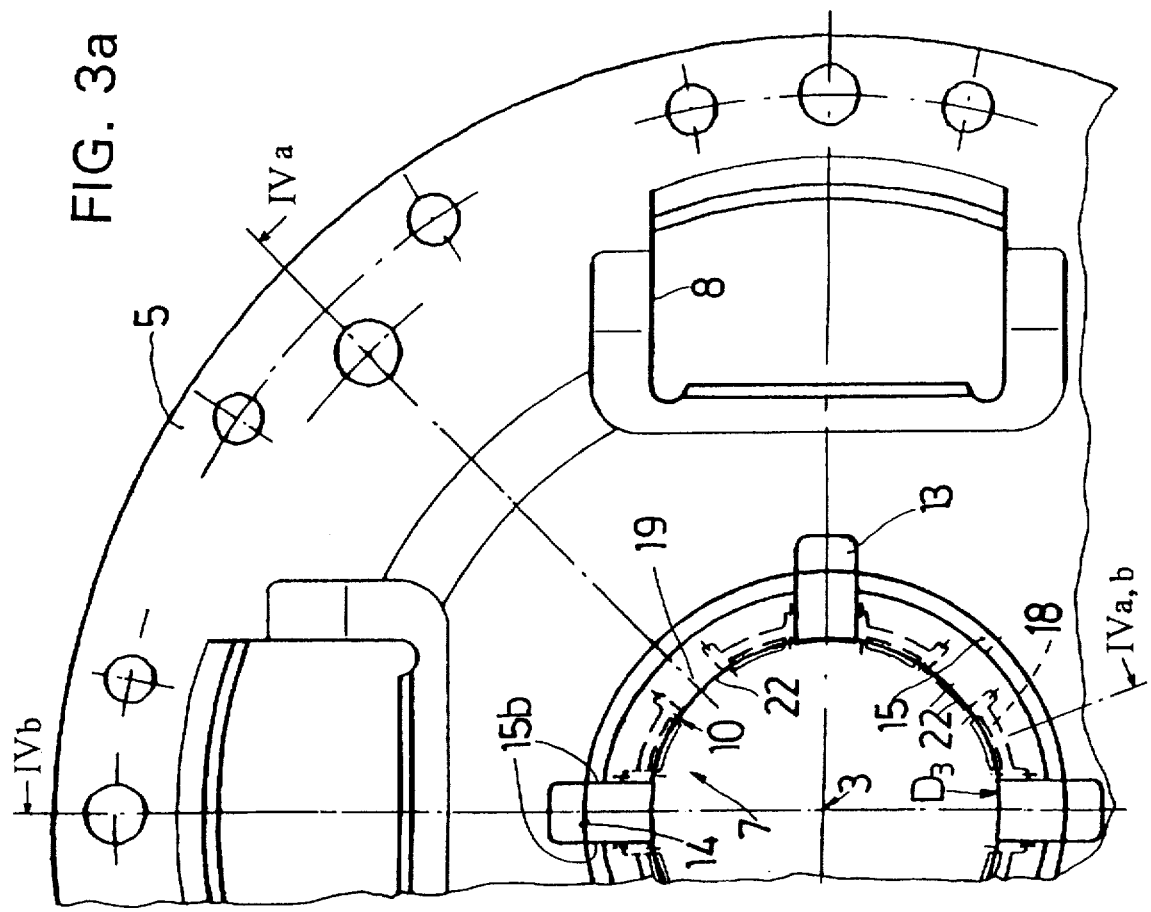

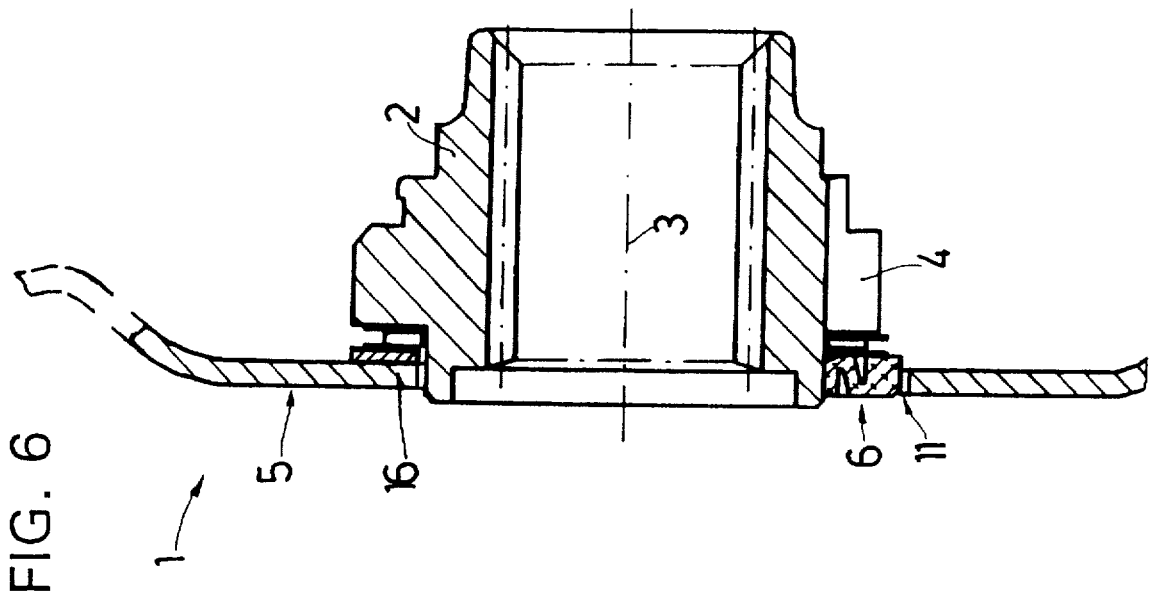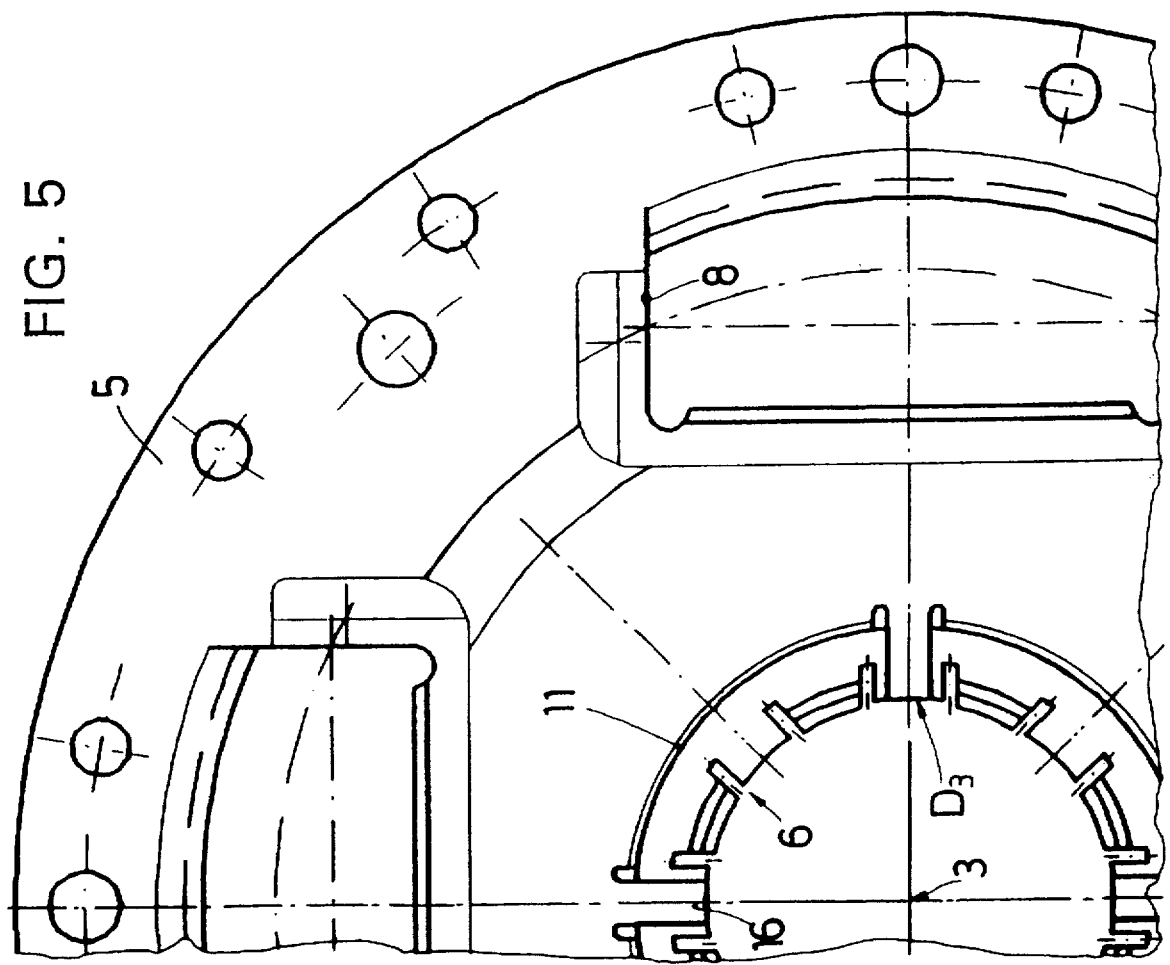

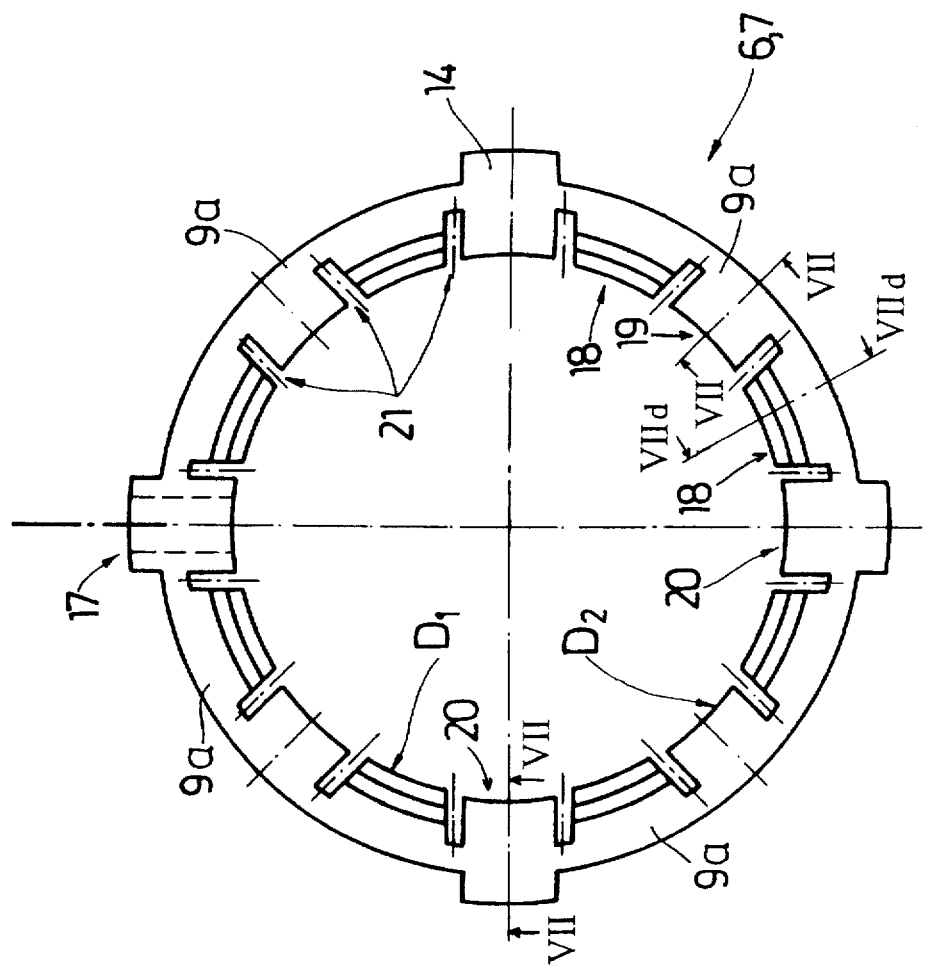
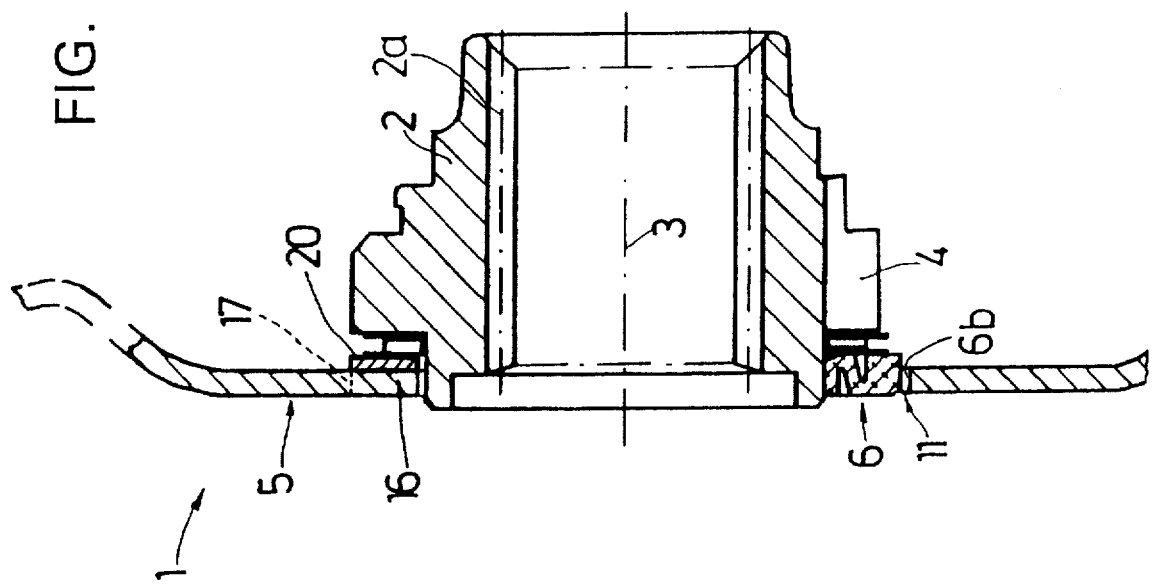

VII-VII

VIId-VIId

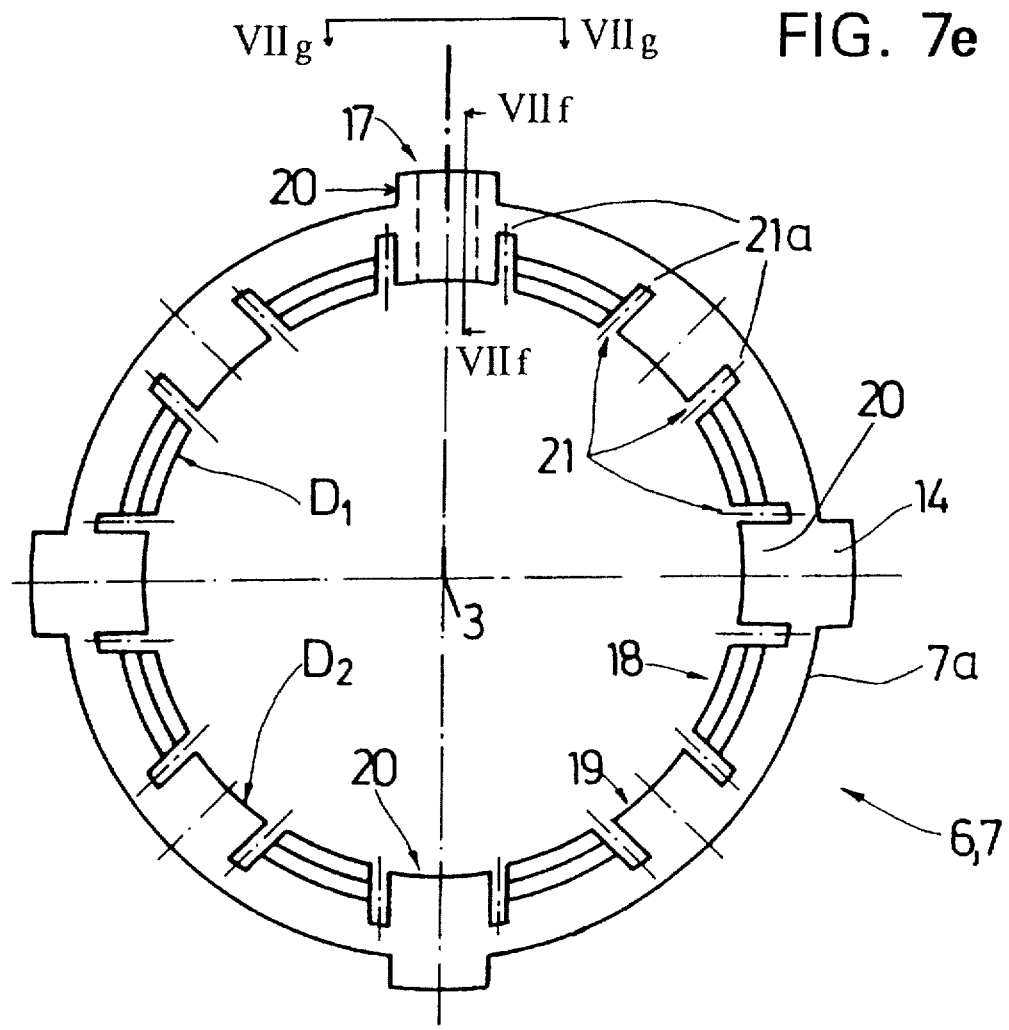
FIG. 7e
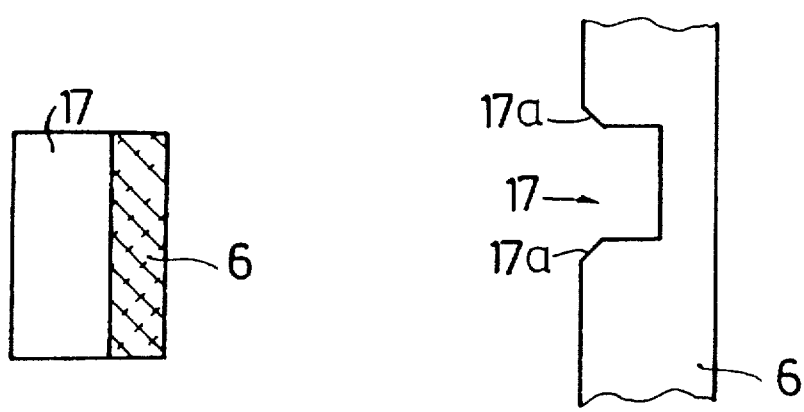
FIG. 7f
FIG. 7g

FRICTION CLUTCH FOR A MOTOR VEHICLE

BACKGROUND OF THE INVENTION

1. Field of the Invention

The present invention relates to a clutch disc for a friction clutch in the drive train of a motor vehicle, the clutch disc generally includes, among other components, a hub with internal gear teeth for placement on a transmission shaft, which hub defines an axis of rotation. The hub has a hub disc and cover plates on both sides of the hub disc. The cover plates can be permanently connected to one another by means of spacer elements and can be held at a distance from one another. In addition, one of the cover plates can have friction linings. The clutch disc can additionally include spring elements in apertures of the hub disc and cover plates, which spring elements can allow for the flexible rotation of both groups in relation to one another under a torque load. In the inner diametral region of a cover plate, there can be a bearing element opposite the hub to fix both groups in relation to one another.

2. Background Information

A clutch disc of the type described above is disclosed, for example, in European patent 0 382 197. On this clutch disc, located in the radially inner area of the one cover plate there is a bearing element which has an essentially L-shaped contour in the vicinity of its external contour. The bearing element is fixed in the axial direction in the cover plate by means of an extending leg.

OBJECT OF THE INVENTION

The object of the present invention is to create a cover plate for a clutch disc with a corresponding bearing element, which bearing element can be manufactured more economically, and which bearing element can make improved operation possible.

SUMMARY OF THE INVENTION

The present invention teaches that this object can be accomplished by providing the bearing element with an external contour, which external contour can preferably be rectangular in cross section, and can have a surface pointing away from the hub and extending perpendicular to the axis of rotation. The axial fixing of the bearing, with respect to the cover plate, can be accomplished by means of several areas located on the circumference of the cover plate, which areas preferably extend over essentially the entire radial dimension of the surface of the bearing element. As such, there is essentially a shifting of the axial fixing of the bearing element to the surface of the bearing element facing away from the hub. This surface of the bearing element facing away from the hub faces towards portions of the circumference of the cover plate, and these portions of the cover plate preferably extend over essentially the entire radial dimension of the surface of the bearing element.

As a result of the preferably rectangular external contour of the bearing element, a simpler shape can be selected for the bearing element. In addition, as a result of the shifting of the axial fixing of the bearing element to the surface of the bearing element facing away from the hub, on one hand, a certain amount of protection for the bearing element can be provided by the cover plate (e.g. against mechanical damage, radial restriction of spring deflection), and on the other hand, a certain amount of space can be saved.

The present invention also teaches that the axial fixing of the bearing element can preferably be accomplished by means of radially disposed guide lugs, which guide lugs can preferably be integral with the material of the cover plate, and which can extend or be exposed axially. The radial guidance for the bearing element can preferably be provided circumferentially, at a distance from the guide lugs, by a discontinuous central opening preferably in the cover plate. Such a discontinuous central opening can easily be manufactured with the required tolerances as a closed, encircling or circling centering.

If a circumferential fixing is necessary, such a fixing can preferably be provided by radial extensions on the bearing element and corresponding radial recesses in the cover plate, the recesses being disposed on the circumference of the cover plate between the guide lugs.

In accordance with another method of providing a fixing between the cover plate and the bearing element, the cover plate can preferably be designed, in the vicinity of its inside diameter, essentially as a flat surface. The cover plate can preferably be divided, also in the vicinity of its inside diameter, into individual segments by means of radial recesses distributed over the circumference of the cover plate, which radial recesses extend essentially to the hub. The large surface areas of the segments can preferably be used for axial fixing of the bearing element and can provide protection for the bearing element against mechanical damage. The radial fixing of the bearing element can preferably be accomplished by means of indentations in the cover plate, which indentations can be introduced from axially outside into the cover plate, and which indentations project correspondingly on the inside of the cover plate and thereby provide radial guidance for the bearing element. The indentations can be manufactured with greater accuracy or precision and can eliminate the re-machining of the inside diameter of the cover plate following the hardening process, which machining step is generally necessary on known devices and which will not be discussed further herein.

An additional possibility for accomplishing the fixing between the cover plate and the bearing element can preferably be provided by pockets which extend radially in the bearing element, and which pockets can preferably be open in the axial direction pointing away from the hub. Guide lugs, which preferably extend radially from the cover plate, can extend into these pockets, and when there are several guide lugs and pockets distributed over the circumference of the cover plate and the bearing element, respectively, a mutual radial guidance can be possible. This mutual radial guidance can essentially be provided without the need for having central, encircling fixing edges, such as the indentations discussed above. In accordance with this arrangement, the central opening in the cover plate can have a radial clearance with respect to the cylindrical external contour of the bearing element, which radial clearance can make the manufacture and assembly easier.

The bearing element can preferably be advantageously divided circumferentially into individual blocks, which blocks can be formed or divided by radial cuts. The radial cuts can preferably start at the inside diameter of the bearing element and can extend over a portion of the radius of the bearing element. Individual first blocks can preferably be designed so that they are radially flexible and have a first inside diameter, which first inside diameter can provide guidance with respect to a cylindrical contour of the hub. Individual second blocks can preferably also be designed so that they are radially rigid and form a second inside diameter, which second inside diameter is preferably larger than the first inside diameter. The second blocks can preferably restrict the radial mobility of the bearing element to a specified dimension. The inside diameter of the cylindrical guide, or of the guide lugs, can also preferably be designed so that it is approximately equal to, or slightly greater than, the second diameter of the second blocks. Thus, the radially inner parts of the cover plate can preferably be used as additional radial stops, to prevent overloading of the bearing element in the event of an extreme and sudden load.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

One aspect of the invention resides broadly in a friction clutch, such as for a motor vehicle, the friction clutch comprising a clutch disc, the clutch disc comprising: a transmission input shaft having an axis of rotation and defining an axial direction parallel to the axis of rotation; a hub, the hub having means for being disposed substantially non-rotatably on the transmission input shaft; the hub comprising a hub disc, the hub disc having a first side and a second side disposed opposite one another; at least one cover plate, the at least one cover plate having an outer circumferential dimension and an inner circumferential dimension disposed within the outer circumferential dimension; the at least one cover plate being disposed adjacent the first side of the hub disc; the inner circumferential dimension of the at least one cover plate being disposed at the hub; bearing means being disposed between the first side of the hub disc and the at least one cover plate and adjacent the inner circumferential dimension of the at least one cover plate; the bearing means having an outer circumferential dimension and an inner circumferential dimension disposed within the outer circumferential dimension of the bearing means; the bearing means comprising: a bearing surface being disposed transverse to the axis of rotation and facing away from the hub; the bearing surface extending substantially between the inner circumferential dimension of the bearing means and the outer circumferential dimension of the bearing means; the at least one cover plate comprising: a cover plate surface being disposed substantially adjacent the inner circumferential dimension of the at least one cover plate and facing towards the hub; and the cover plate surface being disposed substantially adjacent the bearing surface and making contact with substantially all of the bearing surface.

Another aspect of the invention resides broadly in a method of assembling a friction clutch for a motor vehicle, the friction clutch comprising a clutch disc, the clutch disc comprising: a transmission input shaft having an axis of rotation and defining an axial direction parallel to the axis of rotation; a hub, the hub having means for being disposed substantially non-rotatably on the transmission input shaft; the hub comprising a hub disc, the hub disc having a first side and a second side disposed opposite one another; at least one cover plate, the at least one cover plate having an outer circumferential dimension and an inner circumferential dimension disposed within the outer circumferential dimension; the at least one cover plate being disposed adjacent the first side of the hub disc; the inner circumferential dimension of the at least one cover plate being disposed at the hub; bearing means being disposed between the first side of the hub disc and the at least one cover plate and adjacent the inner circumferential dimension of the at least one cover plate; the bearing means having an outer circumferential dimension and an inner circumferential dimension disposed within the outer circumferential dimension of the bearing means; the bearing means comprising: a bearing surface being disposed transverse to the axis of rotation and facing away from the hub; the bearing surface extending substantially between the inner circumferential dimension of the bearing means and the outer circumferential dimension of the bearing means; the at least one cover plate comprising: a cover plate surface being disposed substantially adjacent the inner circumferential dimension of the at least one cover plate and facing towards the hub; and the cover plate surface being disposed substantially adjacent the bearing surface and making contact with substantially all of the bearing surface; the method comprising the steps of: providing a transmission input shaft having an axis of rotation and defining an axial direction parallel to the axis of rotation; providing a hub, the hub having means for being disposed substantially non-rotatably on the transmission input shaft; the step of providing the hub further comprising providing a hub disc, the hub disc having a first side and a second side disposed opposite one another; providing at least one cover plate, the at least one cover plate having an outer circumferential dimension and an inner circumferential dimension disposed within the outer circumferential dimension; providing bearing means, the bearing means having an outer circumferential dimension and an inner circumferential dimension disposed within the outer circumferential dimension of the bearing means; the step of providing the bearing means further comprises: providing a bearing surface; the step of providing the at least one cover plate further comprises: providing a cover plate surface; disposing the at least one cover plate adjacent the first side of the hub disc; positioning the at least one cover plate such that the inner circumferential dimension of the at least one cover plate is disposed at the hub; disposing the bearing means between the first side of the hub disc and the at least one cover plate and adjacent the inner circumferential dimension of the at least one cover plate; extending the bearing surface substantially between the inner circumferential dimension of the bearing means and the outer circumferential dimension of the bearing means; disposing the bearing surface transverse to the axis of rotation, the bearing surface facing away from the hub; and disposing the cover plate surface substantially adjacent the bearing surface, the cover plate surface making contact with substantially all of the bearing surface.

BRIEF DESCRIPTION OF THE DRAWINGS

The present invention is explained in greater detail below with reference to the embodiments illustrated in the accompanying drawings, in which:

FIGS. 1 and 2 show a partial view and partial cross section of a hub disc with bearing element;

FIGS. 3 and 4 show a partial view and partial cross section of a variant design;

FIGS. 3a, 4a and 4b show a partial view and partial cross sections similar to that shown in FIGS. 3 and 4;

FIGS. 5 and 6 show a partial view and partial cross section of an additional design;

FIGS. 5a and 6a show a partial view and partial cross section similar to that shown in FIGS. 5 and 6;

FIGS. 7, 7a, 7b, 7c and 7d show a view and enlarged partial cross sections of a bearing element;

FIGS. 7e, 7f and 7g show a a view and enlarged partial cross sections of a bearing element, similar to that shown in FIGS. 7, 7b, and 7c, respectively.

DESCRIPTION OF THE PREFERRED EMBODIMENT

Figure 2A:
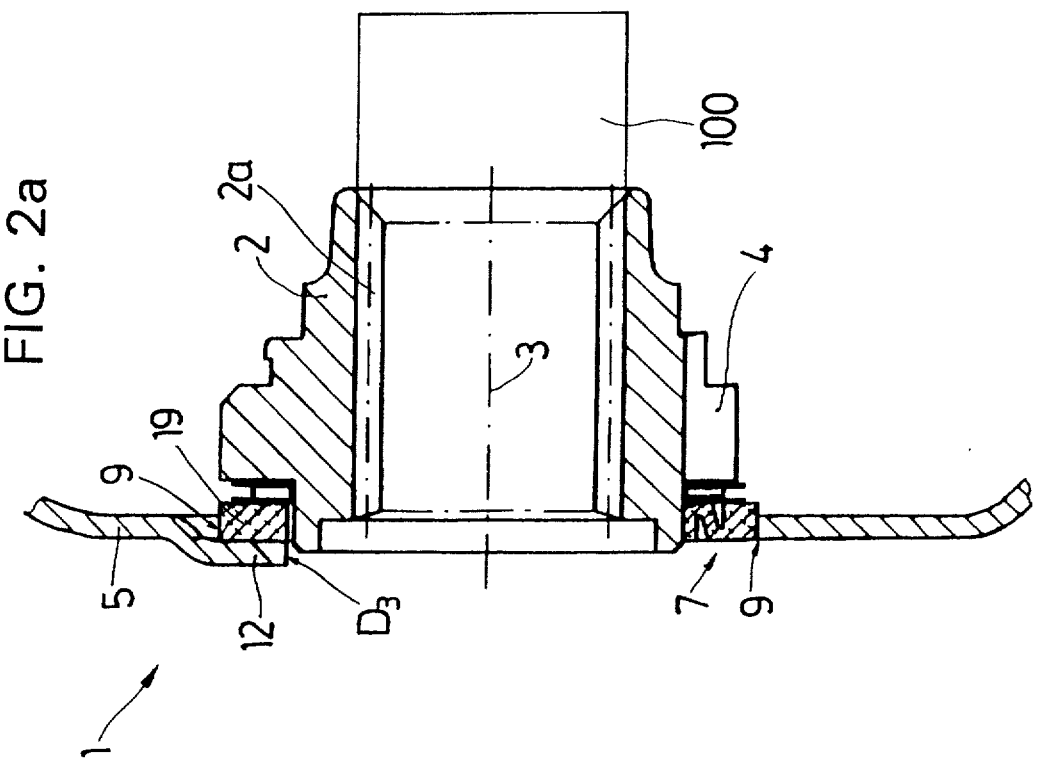
FIG. 2a shows substantially the same view as FIG. 2, but shows additional components.

FIGS. 1 and 2 show a partial view and a partial cross section of a clutch disc 1, which views essentially show only the cover plate 5, the hub 2 and the bearing element 7. The hub 2 can preferably be designed with an internal thread 2a (see FIG. 2a) for non-rotational attachment to a transmission shaft 100 (shown schematically in FIG. 2a), and can be essentially symmetrical and concentric to an axis of rotation 3. In accordance with this embodiment of the present invention, the hub 2 can preferably have external gear teeth 4, in which gear teeth 4 a hub disc (not shown here but see FIG. 8) with corresponding internal gear teeth can be non-rotationally engaged. Alternatively, the hub 2 and the hub disc can preferably be made as one integral piece.

The cover plate 5 can preferably have several apertures or windows 8, which apertures 8 can correspond to apertures of the hub disc. Springs can preferably be inserted into the apertures 8 of the cover plate 5 and the apertures of the hub disc to allow flexible rotation between the cover plate 5 and the hub 2 when torque is applied to the clutch disc 1. The parts which are mounted so that they can rotate with respect to the hub 2 can preferably be centrally guided by means of the radially inner portion of the cover plate 5, and by means of the bearing element 7 with respect to the hub 2.

Figure 7A:
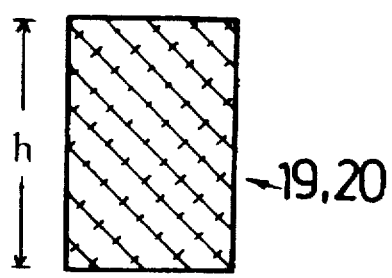

The bearing element 7 can preferably be designed as shown in FIGS. 7 and 7e. As shown in Sections VII—VII and VIId—VIId in FIGS. 7a and 7d, respectively the cross section of the bearing element 7 can preferably be essentially rectangular (FIG. 7a). Further, the bearing ring can preferably be divided circumferentially into several blocks 18, 19 and 20. The division between the blocks 18, 19 and 20 can preferably be made by radial cuts 21 from the radial inside, across a portion of the cross section of the bearing element 7. In other words, and in accordance with one embodiment of the present invention, the cuts 21 can preferably extend from points radially inside the bearing ring 7 into portions of the bearing ring 7, thereby leaving portions 21a (see FIG. 7e) of the bearing ring 7 "uncut".

Figure 7B:
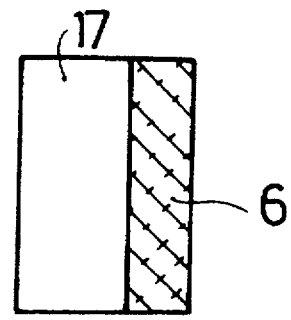
Figure 7C:
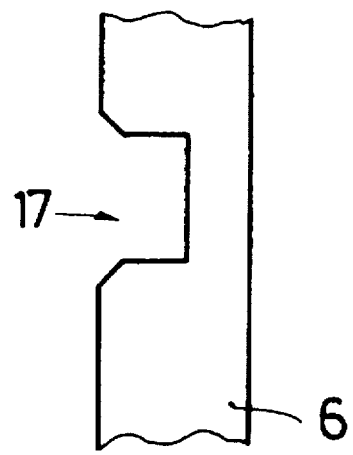
Figure 7D:
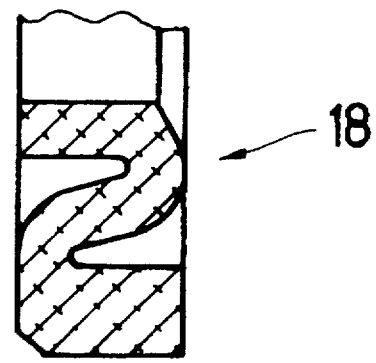

FIG. 7a shows a cross-sectional view of one of the blocks 19 or 20, wherein block 20 would essentially have a greater height h than block 19, and FIG. 7d shows a cross-sectional view of the block 18. The block 18 can preferably be designed with a zig-zag cut, and can thereby provide radial flexibility to the bearing ring 7. In addition, there can preferably be several extensions 14 on the outside circumference 7a (see FIG. 7e) of the bearing element 7, which extensions 14 preferably project radially outward, thus providing the blocks 20 with this greater height. The extensions 14 can preferably provide a non-rotational connection of the bearing element 7 to the cover plate 5. However, the extensions 14 may not be necessary in every case.

As shown in FIG. 1, the cover plate 5 can preferably have a central opening 9, which opening 9 extends over only portions of the circumference of the cover plate 5, i.e. the opening is not continuous. Into this opening 9 the bearing element 7 can preferably be inserted. The bearing element 7 can preferably have cylindrical, central portions 9a (see FIG. 7) disposed circumferentially between the extensions 14. The extensions 14 can preferably extend into radial recesses 13 in the cover plate 5, to provide a non-rotational connection of the bearing element 7 to the cover plate 5. Circumferentially between the radial recesses 13 of the cover plate 5, integral guide lugs 12 can preferably be provided on the cover plate 5. These guide lugs 12 can extend axially far enough so that the central opening 9 can preferably guide the bearing element 7 in the radial direction. In other words, and in accordance with one embodiment of the present invention, the guide lugs 12 can preferably be displaced axially or can bend axially from the remaining portion of the cover plate 5 such that the central opening 9 preferably provides the radial guidance for the bearing element 7. Further, the guide lugs 12 preferably extend radially inward far enough that they form a diameter D3, which diameter D3 is approximately equal to, or slightly greater than, the diameter D2 of the blocks 19 of the bearing element 7, as illustrated in FIGS. 7 and 7e. The guide lugs 12 of the cover plate 5 can thus preferably guide the bearing element 7 in the axial direction pointing away from the hub 2, and the areas of the central opening 9 of the cover plate 5, which areas extend circumferentially between the guide lugs 12, can preferably guide the bearing ring 7 in the radial direction.

As shown in FIGS. 7 and 7e, additional blocks 20 can preferably be distributed circumferentially on the bearing element 7, and the inside diameter of the blocks 20 can essentially equal the diameter D2 of the blocks 19. The blocks 20 can thereby be provided in their radially outward areas with the extensions 14. As illustrated in FIG. 1, the guide lugs 12 can preferably overlap the blocks 19 in the axial direction. Further, and in accordance with one embodiment of the present invention, the blocks 18 can preferably have a diameter D1, which diameter D1 can preferably be slightly smaller than the diameters D2 and D3. However, it should be noted that this particular arrangement is only one example of an arrangement of a cover plate and a bearing element, and that this arrangement is not absolutely essential.

FIGS. 3, 3a, 4, 4a and 4b illustrate additional variants of the present invention in which the cover plate 5 is preferably designed with a flat portion 5a (see FIGS. 4a and 4b) in the vicinity of a central opening 10. The flat portion 5a can preferably be disposed substantially perpendicular to the axis of rotation 3. In this flat portion 5a, an encircling indentation 15 can preferably be introduced from the side of the cover plate 5 which faces away from the hub disc 2 (i.e. on the left side of FIGS. 4, 4a and 4b). The indentation 15 can preferably have a portion 15a (see FIGS. 4a and 4b) which projects from the side of the cover plate 5 which faces the hub 2. The indentation 15 can preferably serve as a radial guide for the bearing element 7.

The central opening 10 of the cover plate 5 can preferably have the diameter D3. The diameter D3 can preferably be approximately equal to or slightly greater than the diameter D2 of the blocks 19 and 20 shown in FIGS. 7 and 7e. Thus, the bearing element 7 shown in FIGS. 7 and 7e can be considered to also represent a plan view of the bearing ring 7 as shown in FIGS. 3, 4, 3a, 4a and 4b. The central opening 10 of the cover plate 5 can preferably be interrupted by several radial recesses 13 which can be distributed circumferentially about the cover plate 5, and which recesses 13 can also interrupt the indentations 15. The extensions 14 of the bearing element 7 can preferably be non-rotationally engaged in the vicinity of the recesses 13, preferably by means of edges 15b (see FIGS. 3a and 4b). The cover plate 5, in its radially inner area, can have several segments 22 disposed circumferentially between the radial recesses 13, on which segments 22 the bearing element 7 can preferably be supported axially, and which segments 22 can serve to protect the bearing element 7 in the axial direction from the outside (i.e. on the left of FIGS. 4, 4a and 4b). The segments 22 can also preferably provide a limitation of the radial deflection in the event of sudden loads.

Figure 3:
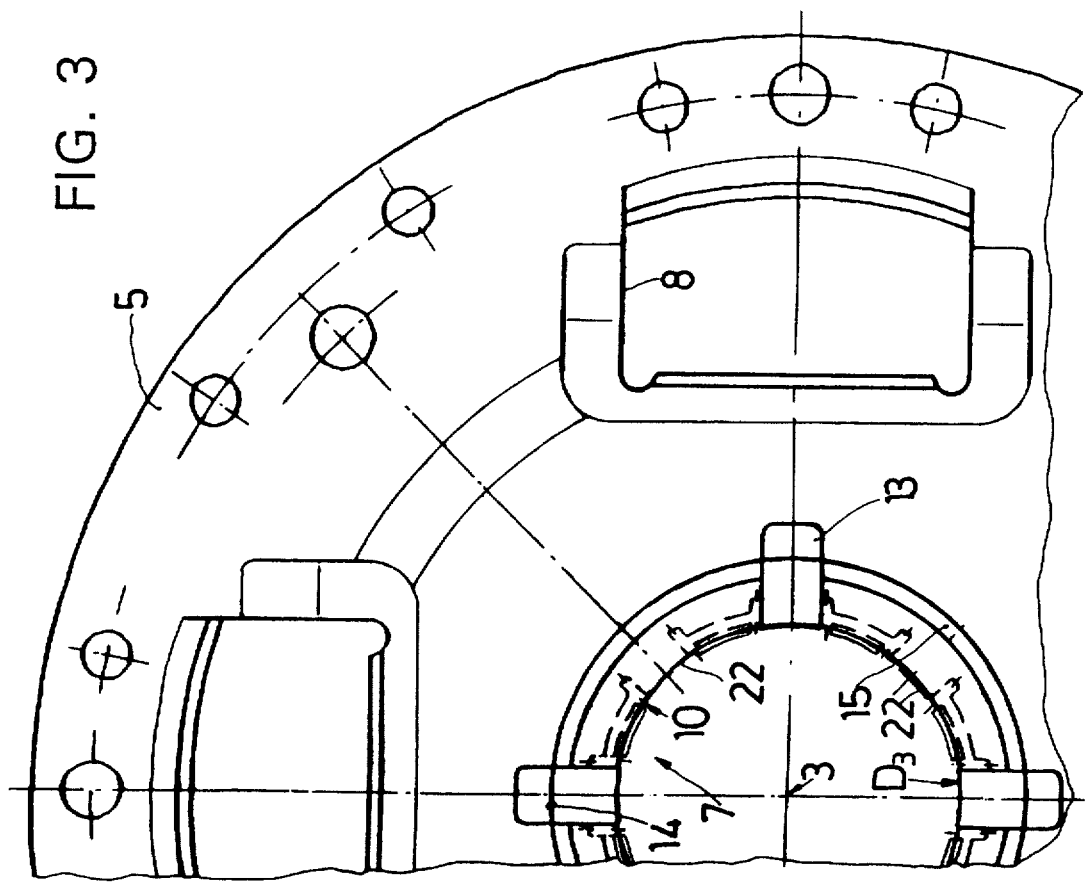
Figure 4A:
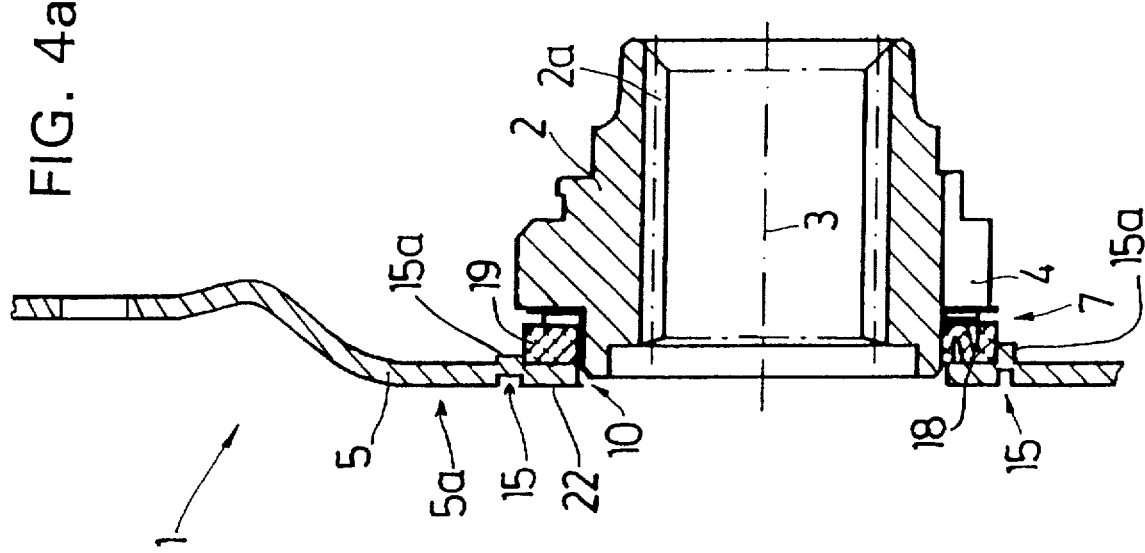
Figure 4B:
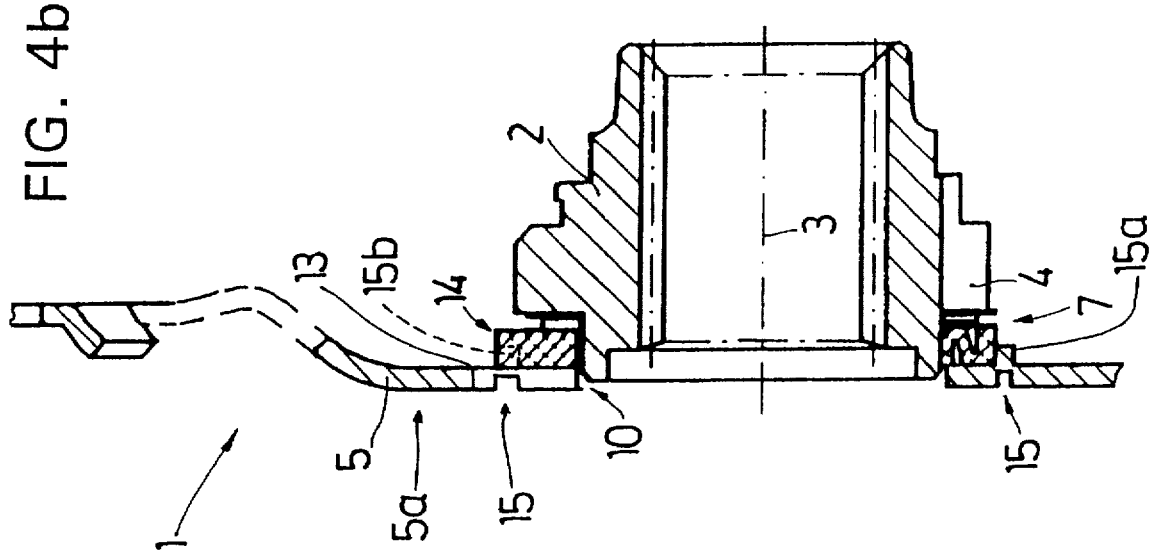
Figure 5A:
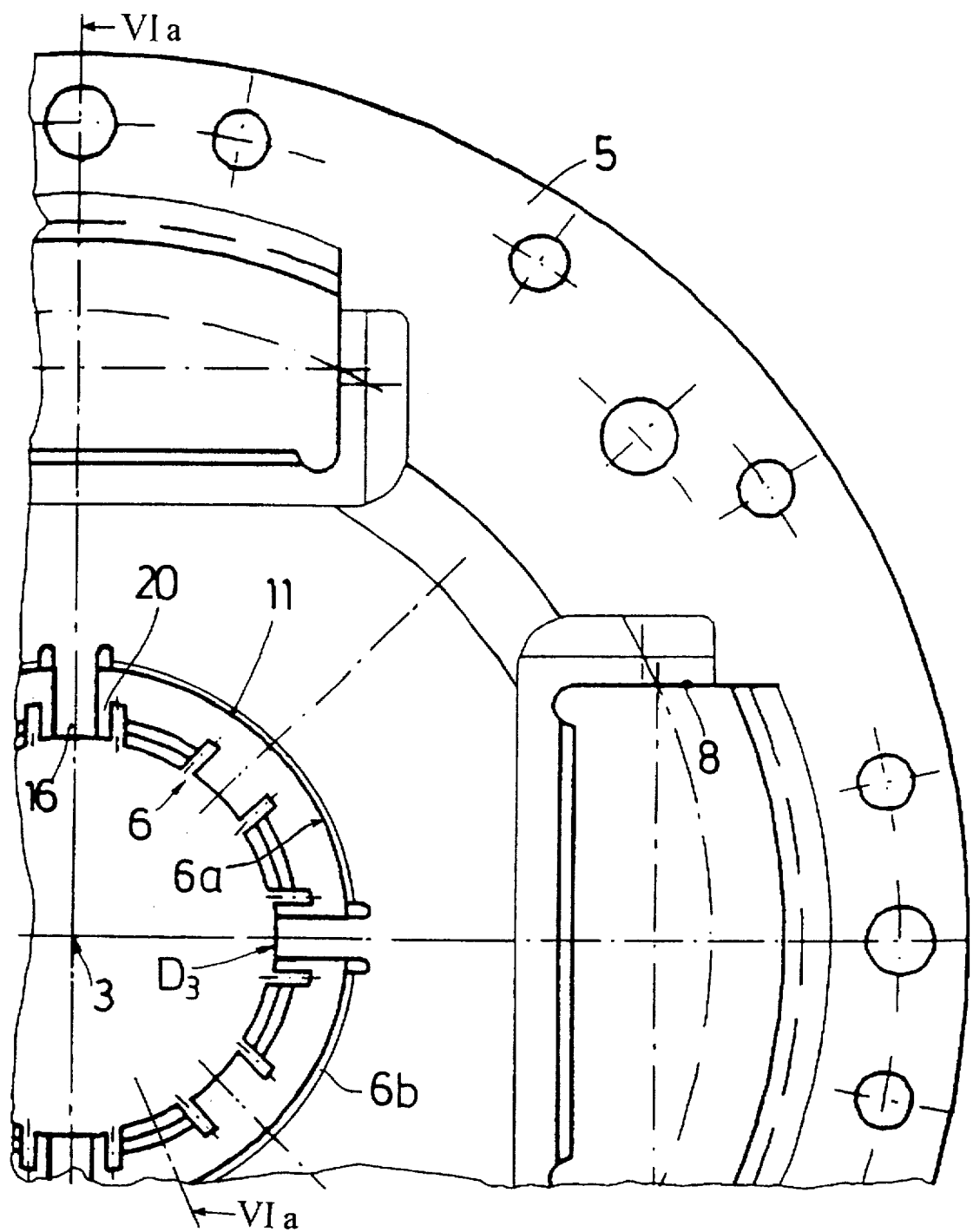

FIGS. 3a and 4a illustrate one embodiment of the present invention, FIG. 4a showing a cross-section of the cover plate 5 and bearing element 7 taken along line IVa—IVa. In FIG. 4a a portion of the bearing element 7, preferably block 19, can be radially held in place by the projecting portion 15a of the indentation 15. In addition, the block 18 can also be seen in cross-section in FIG. 4a, which block 18 can also preferably be radially fixed by the projection portion 15a. FIG. 4b shows an additional cross-section of the cover plate 5 and bearing element 7 taken along line IVb—IVb. In FIG. 4b, the extension 14 of the bearing element 7 can be seen in the vicinity of a recess 13. The projecting portion 15a of the indentation 15 can preferably be interrupted by the recesses 13, as discussed above. Thus, the extensions 14 can fit between the edges 15b of the projecting portion 15a formed by the recesses 13, and the extensions 14 can thus be fixed in the circumferential direction by the edges 15b. As shown in FIGS. 3, 3a, 4, 4a and 4b, the recesses 13 can preferably extend radially outwardly past the indentation 15. However, in accordance with an alternative embodiment of the present invention, the recesses 13 can preferably simply be interruptions in the projecting portion 15a of indentation 15. Thus, in accordance with this alternative embodiment, portions of the indentation 15 could simply not be formed, or portions of the projecting portion 15a could simply be removed to allow for the extensions 14 to be locked between the two adjacent edges or sidewalls 15b of the projecting portion 15a.

An additional variant of the present invention is illustrated in FIGS. 5, 5a, 6 and 6a. In this case, there is a bearing element 6 which, in contrast to the bearing element 7 illustrated in FIGS. 7, 7e, 7a and 7d, preferably has pockets 17 in the blocks 20 (see FIGS. 7 and 7e). It should be noted that the bearing element 6 can be substantially similar to the bearing element 7, except that the bearing element 6 preferably does not have extensions 14 on its outside circumference and instead can have a substantially smooth outside circumference. Thus, FIGS. 7 and 7e can be considered to represent the bearing element 6, except for the extensions 14. The pockets 17 can preferably extend radially within the blocks 20 and can be introduced from the side of the bearing element 6 which faces away from the hub 2 (i.e. the left of FIG. 6a) into the material of the bearing element 6. The pockets 17 can preferably extend over only a portion of the axial thickness of the material of the bearing element 6. When the unit is assembled, the pockets 17 can preferably correspond to guide lugs 16 of the cover plate 5, which guide lugs 16 can extend radially inward from a central opening 11 of the cover plate 5. Further, and in accordance with one embodiment of the present invention, the guide lugs 16 can preferably be engaged in the pockets 17 to preferably provide a circumferential fixing of the bearing element 6 with the cover plate 5.

The central opening 11 of the cover plate 5 can preferably be coordinated to the outside diameter 6a (see FIGS. 5a and 6a) of the bearing element 6 so that a relatively small radial gap 6b (see FIGS. 5a and 6a) can preferably be left to facilitate assembly and installation. The centering between the bearing element 6 and the cover plate 5 is thus provided essentially only by means of the guide lugs 16 of the cover plate 5 and the corresponding pockets 17 in the bearing element 6, whereby there should preferably be at least three of each of these elements distributed on the circumference of the bearing element 6 and the cover plate 5. The guide lugs 16 can thereby also be reduced to a diameter D3 which can serve to restrict the deflection distance for the blocks 18.

FIGS. 7b and 7f show a side view of the pocket 17 preferably taken along line VIIf—VIIf in FIG. 7e. FIGS. 7c and 7g show a top view of the pocket 17 taken along line VIIg—VIIg in FIG. 7e. In accordance with one embodiment of the present invention, the pocket 17 can preferably have beveled portions 17a (see FIG. 7g), which beveled portions 17a can preferably serve to make the insertion of the guide lugs 16 into the pockets 17 easier.

In accordance with one embodiment of the present invention, the bearing element 6, 7 can preferably be made of a resilient or elastic material, such as a plastic, for example polystyrene. Alternatively, the bearing element 6, 7 could possibly be made of a rubber compound.

In accordance with an alternative embodiment of the present invention not shown here, the bearing element 6, 7 could conceivably have an inner circumferential portion and an outer circumferential portion, wherein the inner circumferential portion can have a thickness dimension parallel to the axis 3 which is substantially less than a thickness dimension, also parallel to the axis 3, of the outer circumferential portion. In addition, the bearing element 6, 7 can preferably have an angled surface preferably extending between the inner and outer circumferential portions, the angled surface preferably being disposed at an angle with respect to the axis 3. In accordance with this particular embodiment, the cover plate 5 can thereby preferably have an angled portion which corresponds to the angled surface of the bearing element 6, 7, and which angled portion preferably makes contact with the angled surface of the bearing element 6, 7.

In accordance with yet an additional embodiment not shown here, the angled surface of the bearing element 6, 7 described immediately hereinabove can preferably extend over only a portion of the bearing element 6, 7, between the inner circumferential portion and the outer circumferential portion. Thus, there can preferably be an additional portion disposed between the inner and outer circumferential portions, which additional portion can be disposed substantially perpendicular to the axis 3. Of course, the cover plate 5 can preferably have an angled portion for contacting the angled portion of the bearing element 6, 7.

In accordance with yet an additional embodiment of the present invention not shown here, the bearing element 6, 7 can preferably have an angled portion extending from the inner circumferential portion towards the outer circumferential portion, however, there can preferably be a radially outwardly extending flanged portion of the bearing element 6, 7, which flanged portion preferably extends into the outer circumferential portion. Thus, there can preferably be a transition surface between the angled portion and the flanged portion. This transition surface can preferably be disposed substantially parallel to the axis 3. Of course, the cover plate 5 can preferably have an angled portion for contacting the angled portion of the bearing element 6, 7.

Figure 8:
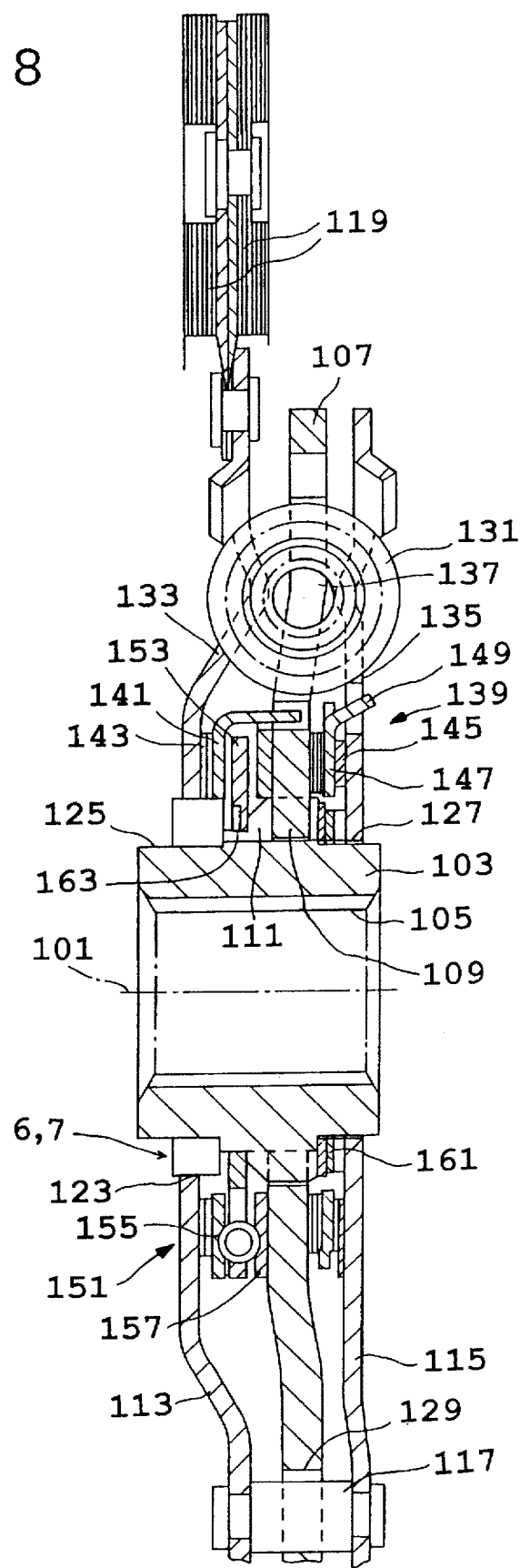
FIG. 8 shows a clutch disc unit which may be utilized in accordance with the present invention.

FIG. 8 shows an example of a clutch disc in which the bearing element 6, 7 of the present invention could conceivably be installed. It should be understood that components found hereinbelow can be considered to be interchangeable with similar components discussed hereinabove with reference to FIGS. 1–7d. It should be noted that the bearing element 6, 7 of the present invention is shown schematically only in FIG. 8. Particularly, FIG. 8 shows a clutch disc comprising a hub 103 which can preferably be coaxial with an axis of rotation 101 of a gearbox input shaft (not shown here but see FIG. 2a) and can be coupled nonrotatably but axially movably to the gearbox shaft via its internal teeth 105. The hub 103 can preferably carry an annular, substantially radially projecting hub disc 107, which hub disc 107 can be coupled non-rotatably via internal teeth 109, but with limited rotational clearance, to external teeth 111 of the hub 103. Lateral discs or cover plates 113 and 115 can preferably be arranged axially on either side of the hub disc 107, and can be connected rigidly by spacer rivets 117 to form a unit. The lateral disc 113 can preferably carry clutch friction linings 119. The lateral disc 113 provided with the clutch friction linings 119 can be rotatably mounted axially to the side of the hub disc 107 on a cylindrical outer peripheral face 125 of the hub 163 via the bearing element 6, 7. The bearing element 6, 7 can preferably be inserted into a central opening 123 in the lateral disc 113. The hub 103 preferably passes with radial clearance through a central opening 127 in the other lateral disc 115. The spacer rivets 117 can preferably penetrate openings 129 in the hub disc 107 and can simultaneously limit the angle of rotation of the lateral discs 113 and 115 relative to the hub 103.

The lateral discs 113 and 115 can preferably be rotatably coupled to the hub disc 107 via several helical springs 131, which are mutually offset in the peripheral direction and of which only one is shown, and to the hub 103 via the teeth 107. The helical springs 131 preferably rest in windows 133, 135 and 137 which are respectively orientated axially relative to one another of the lateral discs 113 and 115 on the one hand, and the hub disc 107 on the other hand. The springs 131 preferably form a torsional vibration damper which can be effective during operation under load, and which vibration damper can preferably be provided with a load frictional device 139 arranged between the lateral discs 113 and 115. The load frictional device 139 preferably comprises a frictional ring 143 arranged between the lateral disc 113 and a thrust collar 141 supported on the hub disc 107, as well as a further frictional ring 145 which is supported on the hub disc 107 and is pressed by a spring washer 147 supported on the lateral disc 115 via a thrust collar 149 guided non-rotatably on the lateral disc 115 against the hub disc 107.

The load frictional device 139 is effective essentially only after compensation of the rotational clearance of the teeth 109 and 111. The rotational clearance typically determines the operating range of a torsional vibration damper 151 which is designed for idling and comprises a further hub disc 153 held non-rotatably on the hub 103, and at least one helical spring 155 by means of which spring 155 the hub 103 can preferably be rotatably coupled to the lateral disc 113. The spring 155 preferably rests in recesses which can preferably be oriented axially to one another in a lateral disc 157, which disc 157 can be connected non-rotatably to the hub disc 107, and in recesses of the thrust collar 141 and the hub disc 153. A frictional device designed for idling preferably comprises an axially acting undulating spring 161, which spring 161 can be supported between the lateral disc 115 on the one hand and via a thrust collar on the hub 103 on the other hand.

One feature of the invention resides broadly in the clutch disc for a friction clutch in the drive train of a motor vehicle, comprising a hub with internal gear teeth for placement on a transmission shaft which defines an axis of rotation, and has a hub disc, cover plates on both sides of said hub disc which are permanently connected to one another by means of spacer elements and are held at a distance from one another, and one of which has friction linings, spring elements in apertures of the hub disc and cover plates for the flexible rotation of both groups in relation to one another under a torque load, whereby in the inner diametral region of a cover plate, there is a bearing element opposite the hub to fix both groups in relation to one another, characterized by the fact that the bearing element 6, 7 has an external contour which is rectangular in longitudinal section, with a surface pointing away from the hub 2 perpendicular to the axis of rotation 3, and the axial fixing with respect to the cover plate 5 is accomplished by means of several areas 12, 16, 22 located on the circumference of the cover plate 5 and which run over the entire radial dimension of the surface.

Another feature of the invention resides broadly in the clutch disc characterized by the fact that the cover plate 5 has a central opening 9, the diameter of which is essentially equal to the outside diameter of the bearing element 7, and at several points separated from one another on the circumference, integral guide lugs are cut out from the material of the cover plate, and run essentially radially inward, ending on a smaller diameter D3 than that of the central opening 9, and are essentially parallel and axially offset from the area of the central opening 9 pointing away from the hub 2.

Yet another feature of the invention resides broadly in the clutch disc characterized by the fact that in the central opening 9, circumferentially between the guide lugs 12, there are radial recesses 13, in which extensions 14 which project radially from the outside diameter of the bearing element 7 are non-rotationally engaged.

Still another feature of the invention resides broadly in the clutch disc characterized by the fact that the cover plate 5 is designed in its inner diametral area as a flat surface running perpendicular to the axis of rotation 3, with a central opening 10, and the bearing element 7 is in contact with the inside of the cover plate 5, and the radial fixing takes place by means of indentations 15 which are made from the outside axially into the cover plate 5, and project in a circular fashion on the inside in an area of cover plate 5 which has a diameter larger than that of the central opening 10.

A further feature of the invention resides broadly in the clutch disc characterized by the fact that in the cover plate 5, starting from the central opening 10, several recesses 13 which run radially are distributed over the circumference and divide the radially inner area of the cover plate into segments 22 and interrupt the indentations 15, and whereby extensions 14 which project radially from the outside diameter of the bearing element 7 are non-rotationally engaged in the interruptions.

Another feature of the invention resides broadly in the clutch disc characterized by the fact that the cover plate 5 is designed in its inner diametral area as a flat surface running perpendicular to the axis of rotation 3, has a circumferentially discontinuous central opening 11 with a diameter which is approximately equal to or greater than the outside diameter of the bearing element 6, the interruptions are formed by guide lugs 16 which are distributed on the circumference of the central opening and project radially inward from the central opening, and the bearing element 6 has a greater axial dimension than the thickness of the material of the cover plate 5 in the vicinity of the central opening 12, and the bearing element 6 is centered with axially-introduced, radially-running pockets 17 in which the guide lugs 16 are engaged, at least in the circumferential direction, essentially without play or clearance.

Yet another feature of the invention resides broadly in the clutch disc characterized by the fact that the bearing element 6 is inserted into the central opening 11 from the inside of the cover plate 5.

Still another feature of the invention resides broadly in the clutch disc characterized by the fact that the bearing element 6, 7 is divided circumferentially into individual blocks 18, 19, 20 which are formed by radial cuts 21 from the inside diameter over a portion of the radial dimension, individual first blocks 18 are radially flexible and form a first inside diameter D1, individual second blocks 19 are radially rigid and form a second inside diameter D2 which is greater than the first inside diameter, whereby the inside diameter D3 of the central opening 10 or of the guide lugs 12, 16 is approximately equal to or slightly greater than the diameter D2 of the second blocks 19.

Types of clutch discs which could be used in accordance with the present invention may be disclosed in the following U.S. patents: U.S. Pat. No. 5,251,736 to Jeppe et al. on Oct. 12, 1993, entitled "Clutch Plate for a Motor Vehicle Friction Clutch"; U.S. Pat. No. 5,249,660 to Feldhaus et al. on Oct. 5, 1993, entitled "Clutch Disc for a Motor Vehicle Friction Clutch"; U.S. Pat. No. 5,238,096 to Ament et al. on Aug. 24, 1993, entitled "Clutch Plate for a Motor Vehicle Friction Clutch"; and U.S. Pat. No. 5,016,744 to Fischer et al. on May 21, 1991, entitled "Clutch Disc for a Friction Clutch".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 44 124.6, filed on Dec. 23, 1993, having inventor Harald Jeppe, and DE-OS P 43 44 124.6 and DE-PS P 43 44 124.6, as well as their published equivalents, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle, said friction clutch comprising a clutch disc, said clutch disc comprising:

a hub, said hub having means for being disposed substantially non-rotatably on a transmission input shaft, the transmission input shaft having an axis of rotation and defining an axial direction parallel to the axis of rotation;

said hub comprising a hub disc, said hub disc having a first side and a second side disposed opposite one another;

at least one cover plate, said at least one cover plate having an outer circumference and an inner circumference, said inner circumference being disposed within said outer circumference;

said at least one cover plate being disposed adjacent said first side of said hub disc;

said inner circumference of said at least one cover plate being disposed at said hub;

bearing means being disposed between said first side of said hub disc and said at least one cover plate, and adjacent said inner circumference of said at least one cover plate;

said bearing means having an outer circumference and an inner circumference, said inner circumference of said bearing means being disposed within said outer circumference of said bearing means;

said bearing means comprising:
at least one portion having a cross-section defined between said inner circumference of said bearing means and said outer circumference of said bearing means;
said cross-section lying in a plane intersecting the axis of rotation;
said cross-section being rectangular;
said at least one portion comprising a bearing surface;
said bearing surface being disposed transversely with respect to the axis of rotation and facing away from said hub;
said bearing surface extending between said inner circumference of said bearing means and said outer circumference of said bearing means;

said at least one cover plate comprising:
at least one cover plate surface being disposed substantially adjacent said inner circumference of said at least one cover plate and facing towards said hub;
said at least one cover plate surface being disposed substantially adjacent said bearing surface and making contact with a substantial portion of said bearing surface to thereby form a contiguous area of contact between said at least one cover plate surface and said bearing surface, to axially guide said bearing means at least with respect to said at least one cover plate; and said contiguous area of contact being a substantial area.

2. The friction clutch according to claim 1 wherein said substantial area lies in an arc length of at least about 10° in a plane transverse to the axis of rotation.

3. The friction clutch according to claim 1 wherein said substantial area lies in an arc length of about 10° to about 20° in a plane transverse to the axis of rotation.

4. The friction clutch according to claim 3 wherein:

said bearing surface has a surface area; and said at least one cover plate surface makes contact with the entire extent of said surface area of said bearing surface, to axially guide said bearing means at least with respect to said at least one cover plate.

5. The friction clutch according to claim 4 wherein:

said bearing surface is disposed substantially perpendicular with respect to the axis of rotation and faces away from said hub disc; and said at least one cover plate surface is disposed substantially perpendicular to the axis of rotation and faces towards said hub disc.

6. The friction clutch according to claim 5 wherein:

said inner circumference of said at least one cover plate comprises an opening, said opening having a diameter;

said at least one cover plate further comprises a main body portion extending between said outer circumference of said at least one cover plate and said inner circumference of said at least one cover plate, said main body portion comprising a substantially flat portion disposed adjacent said opening;

said substantially flat portion is disposed perpendicular with respect to the axis of rotation; and said substantially flat portion comprises said at least one cover plate surface.

7. The friction clutch according to claim 6 wherein:

said at least one cover plate further comprises:

at least one axial indentation disposed adjacent said substantially flat portion for radially positioning said bearing means with respect to said at least one cover plate; and said at least one indentation comprises a projecting portion facing said first side of said hub disc, said at least one projecting portion making contact with said outer circumference of said bearing means.

8. The friction clutch according to claim 7 wherein:

said at least one cover plate further comprises:

a plurality of axial indentations disposed about said opening, each of said plurality of axial indentations having a corresponding projecting portion making contact with said outer circumference of said bearing means;

each of said plurality of indentations describes a partial circular arc and each has a diameter, measured with respect to the axis of rotation;

said diameters of said plurality of indentations being substantially greater than said diameter of said opening;

a plurality of radial recesses extending from said opening towards said outer circumference of said at least one cover plate, said plurality of recesses being spaced-apart from one another;

said at least one cover plate surface comprises a plurality of cover plate surfaces, each of said plurality of cover plate surfaces being disposed between two adjacent ones of said plurality of recesses;

each one of said plurality of recesses are disposed to interrupt ones of said plurality of projecting portions of said indentations; and said bearing means further comprises a plurality of projections extending radially outwardly from said outer circumference of said bearing means, each of said plurality of projections being non-rotatably engaged in a corresponding one of said plurality of recesses.

9. The friction clutch according to claim 8 wherein:

each of said plurality of projecting portions of said indentations has a first edge portion and a second edge portion disposed a substantial circumferential distance from one another, each of said plurality of recesses being disposed between said first edge portions of ones of said plurality of projecting portions and said second edge portions of a neighboring one of said plurality of projecting portions;

each one of said plurality of projections of said bearing means being substantially circumferentially fixed between said first edge portions of ones of said plurality of projecting portions and said second edge portions of a neighboring one of said plurality of projecting portions;

said at least one portion having said bearing surface comprises a plurality of portions each having a bearing surface, each of said plurality of bearing surfaces making contact with a corresponding one of said plurality of cover plate surfaces;

said outer circumference of said bearing means has a diameter;

said bearing means further comprises:

a plurality of slots extending radially outwardly from said inner circumference of said bearing means towards said outer circumference of said bearing means;

a plurality of first portions disposed between said inner circumference of said bearing means and said outer circumference of said bearing means, each of said plurality of first portions being radially flexible and having an S-shaped cross section;

said plurality of portions having said bearing surfaces being disposed between said inner circumference of said bearing means and said outer circumference of said bearing means, each of said plurality of portions having said bearing surfaces being substantially rigid;

a plurality of second portions disposed between said inner circumference of said bearing means and said outer circumference of said bearing means;

each of said plurality of second portions comprises one of said plurality of projections;

each of said plurality of first portions is disposed between one of said plurality of portions having said bearing surfaces and one of said plurality of second portions;

some of said plurality of slots are disposed between one of said plurality of first portions and an adjacent one of said plurality of portions having said bearing surfaces, to separate said first portions from said portions having said bearing surfaces;

other ones of said plurality of slots are disposed between one of said plurality of first portions and an adjacent one of said plurality of second portions, to separate said first portions from said second portions;

said plurality of first portions have a common inner diameter and a common outer diameter, said outer diameter of said first portions being substantially the same as said diameter of said outer circumference of said bearing means;

each of said plurality of portions having said bearing surfaces have a common inner diameter and a common outer diameter, said outer diameter of said portions having said bearing surfaces being substantially the same as said diameter of said outer circumference of said bearing means;

said inner diameters of said plurality of portions having said bearing surfaces being greater than said inner diameters of said plurality of first portions;

said hub further comprises a plurality of gear teeth for engaging with gear teeth of the transmission input shaft;

said at least one cover plate is a first cover plate;

said clutch disc further comprises:

a second cover plate, said second cover plate being disposed adjacent said second side of said hub disc;

means for connecting said first cover plate to said second cover plate and for maintaining said first cover plate and said second cover plate in a spaced-apart relationship with respect to one another;

said first cover plate comprises friction linings disposed adjacent said outer circumference of said first cover plate;

said hub disc comprises a plurality of apertures;

said first and second cover plates each comprise a plurality of apertures;

said clutch disc further comprises a plurality of springs disposed in said plurality of apertures of said first and second cover plates and in said plurality of apertures of said hub disc, to provide damped rotational displacement of said hub disc with respect to said first and second cover plates;

each one of said plurality of second portions comprises a substantially rectangular cross-section; and said diameter of said opening is substantially equal to or greater than said diameters of said plurality of portions having said bearing surfaces.

10. The friction clutch according to claim 5 wherein said at least one cover plate further comprises at least one guide lug extending radially inwardly from said inner circumference of said at least one cover plate towards the axis of rotation, said at least one guide lug comprising said at least one cover plate surface and being integral with said at least one cover plate.

11. The friction clutch according to claim 10 wherein:

said inner circumference of said at least one cover plate comprises an opening, said opening having a diameter;

said outer circumference of said bearing means has a diameter, said diameter of said opening being greater than or substantially equal to said diameter of said outer circumference of said bearing means.

12. The friction clutch according to claim 11 wherein:

said at least one cover plate surface comprises a plurality of cover plate surfaces;

said at least one guide lug further comprises a plurality of guide lugs disposed spaced-apart from one another about said inner circumference of said at least one cover plate;

each of said plurality of guide lugs comprises one of said plurality of cover plate surfaces;

said at least one portion of said bearing means comprises a plurality of portions each having a bearing surface, each of said bearing surfaces making contact with a corresponding one of said cover plate surfaces of said plurality of guide lugs; and each of said plurality of guide lugs has an inner diameter, measured with respect to the axis of rotation, said inner diameters of said plurality of guide lugs being substantially less than said diameter of said opening.

13. The friction clutch according to claim 12 wherein:

said inner circumference of said at least one cover plate further comprises a plurality of radial recesses extending from said opening towards said outer circumference of said at least one cover plate, each of said plurality of recesses being disposed between two adjacent ones of said plurality of guide lugs; and said bearing means further comprises a plurality of projections extending radially outwardly from said outer circumference of said bearing means, each of said plurality of projections being non-rotatably engaged in a corresponding one of said plurality of recesses.

14. The friction clutch according to claim 13 wherein:

said at least one cover plate further comprises a main body portion extending between said outer circumference of said at least one cover plate and said inner circumference of said at least one cover plate; and said plurality of guide lugs are axially offset, in a direction away from said hub disc, from said main body portion of said at least one cover plate.

15. The friction clutch according to claim 14 wherein:

said bearing means further comprises:

a plurality of slots extending radially outwardly from said inner circumference of said bearing means towards said outer circumference of said bearing means;

a plurality of first portions disposed between said inner circumference of said bearing means and said outer circumference of said bearing means, each of said plurality of first portions being radially flexible and having an S-shaped cross section;

said plurality of portions having said bearing surfaces being disposed between said inner circumference of said bearing means and said outer circumference of said bearing means, each of said plurality of portions having said bearing surfaces being substantially rigid;

a plurality of second portions disposed between said inner circumference of said bearing means and said outer circumference of said bearing means;

each of said plurality of second portions comprises one of said plurality of projections;

each of said plurality of first portions is disposed between one of said plurality of portions having said bearing surfaces and one of said plurality of second portions;

some of said plurality of slots are disposed between one of said plurality of first portions and an adjacent one of said plurality of portions having said bearing surfaces, to separate said first portions from said portions having said bearing surfaces;

other ones of said plurality of slots are disposed between one of said plurality of first portions and an adjacent one of said plurality of second portions, to separate said first portions from said second portions;

said plurality of first portions have a common inner diameter and a common outer diameter, measured with respect to the axis of rotation, said outer diameter of said first portions being substantially the same as said diameter of said outer circumference of said bearing means;

said plurality of portions having said bearing surfaces have a common inner diameter and a common outer diameter, measured with respect to the axis of rotation, said outer diameter of said portions having said bearing surfaces being substantially the same as said diameter of said outer circumference of said bearing means;

said inner diameters of said plurality of portions having said bearing surfaces are greater than said inner diameters of said plurality of first portions;

said inner diameters of said plurality of guide lugs are substantially equal to or greater than said inner diameters of said plurality of portions having said bearing surfaces;

said hub further comprises a plurality of gear teeth for engaging with gear teeth of the transmission input shaft;

said at least one cover plate is a first cover plate;

said clutch disc further comprises:

a second cover plate, said second cover plate being disposed adjacent said second side of said hub disc;

means for connecting said first cover plate to said second cover plate and for maintaining said first cover plate and said second cover plate in a spaced-apart relationship with respect to one another;

said first cover plate comprises friction linings disposed adjacent said outer circumference of said first cover plate;

said hub disc comprises a plurality of apertures;

said first and second cover plates each comprise a plurality of apertures;

said clutch disc further comprises a plurality of springs disposed in said plurality of apertures of said first and second cover plates and in said plurality of apertures of said hub disc, to provide damped rotational displacement of said hub disc with respect to said first and second cover plates;

each one of said plurality of second portions comprise a substantially rectangular cross-section; and each one of said plurality of guide lugs of said first cover plate having been cut-out from portions of said inner circumference of said first cover plate.

16. The friction clutch according to claim 11 wherein:

said bearing means comprises at least one recess extending radially from said inner circumference of said bearing means to said outer circumference of said bearing means, said bearing surface of said at least one portion defining a part of said at least one recess; and said at least one guide lug is engaged in said at least one recess.

17. The friction clutch according to claim 16 wherein said at least one guide lug is engaged in said at least one recess substantially without play, at least in the circumferential direction.

18. The friction clutch according to claim 17 wherein:

said at least one cover plate further comprises a main body portion extending between said outer circumference of said at least one cover plate and said inner circumference of said at least one cover plate;

said main body portion comprises a substantially flat portion disposed adjacent said opening, said substantially flat portion being disposed perpendicular to the axis of rotation;

said substantially flat portion of said at least one cover plate has a thickness dimension defined substantially parallel to the axis of rotation; and said bearing means has a thickness dimension defined substantially parallel to the axis of rotation, said thickness dimension of said bearing means being substantially greater than said thickness dimension of said substantially flat portion of said at least one cover plate.

19. The friction clutch according to claim 18 wherein:

said at least one cover plate surface comprises a plurality of cover plate surfaces;

said at least one portion of said bearing means comprises a plurality of portions each having a bearing surface;

said at least one guide lug comprises a plurality of guide lugs disposed spaced-apart from one another about said inner circumference of said at least one cover plate;

each of said plurality of guide lugs comprises one of said plurality of cover plate surfaces;

said bearing means further comprises a plurality of recesses extending radially from said inner circumference of said bearing means to said outer circumference of said bearing means;

each of said plurality of guide lugs is engaged in a corresponding one of said plurality of recesses substantially without play, in at least the circumferential direction; and each of said plurality of bearing surfaces define a part of one of said plurality of recesses, each of said plurality of bearing surfaces making contact with a corresponding one of said plurality of guide lugs.

20. The friction clutch according to claim 19 wherein:

each of said plurality of recesses comprises a first side and a second side, said first side and said second side being disposed substantially perpendicular to said part of said recess defined by one of said plurality of bearing surfaces;

said first side and said second side each comprise a bevelled portion for permitting insertion of a corresponding one of said plurality of guide lugs;

each of said plurality of guide lugs has an inner diameter, measured with respect to the axis of rotation, said inner diameters of said plurality of guide lugs being substantially less than said diameter of said opening;

said bearing means further comprises:
  a plurality of slots extending radially outwardly from said inner circumference of said bearing means towards said outer circumference of said bearing means;
  a plurality of first portions disposed between said inner circumference of said bearing means and said outer circumference of said bearing means, each of said plurality of first portions being radially flexible and having an S-shaped cross section;
  said plurality of portions having said bearing surfaces being disposed between said inner circumference of said bearing means and said outer circumference of said bearing means, each of said plurality of portions having said bearing surfaces being substantially rigid;
  each of said plurality of recesses being disposed at one of said plurality of portions having said bearing surfaces;
  a plurality of second portions disposed between said inner circumference of said bearing means and said outer circumference of said bearing means;
  each of said plurality of first portions is disposed between one of said plurality of portions having said bearing surfaces and one of said plurality of second portions;
  some of said plurality of slots are disposed between one of said plurality of first portions and an adjacent one of said plurality of portions having said bearing surfaces, to separate said first portions from said portions having said bearing surfaces;
  other ones of said plurality of slots are disposed between one of said plurality of first portions and an adjacent one of said plurality of second portions, to separate said first portions from said second portions;
  said plurality of first portions have a common inner diameter and a common outer diameter, said outer diameter of said first portions being substantially the same as said diameter of said outer circumference of said bearing means;
  said plurality of portions having said bearing surfaces have a common inner diameter and a common outer diameter, said outer diameter of said portions having said bearing surfaces being substantially the same as said diameter of said outer circumference of said bearing means;
  said inner diameters of said plurality of portions having said bearing surfaces are greater than said inner diameters of said plurality of first portions;
  said inner diameters of said plurality of guide lugs are substantially equal to or greater than said inner diameters of said plurality of portions having said bearing surfaces;

said hub further comprises a plurality of gear teeth for engaging with gear teeth of the transmission input shaft;

said at least one cover plate is a first cover plate;

said clutch disc further comprises:

a second cover plate, said second cover plate being disposed adjacent said second side of said hub disc;

means for connecting said first cover plate to said second cover plate and for maintaining said first cover plate and said second cover plate in a spaced-apart relationship with respect to one another;

said first cover plate comprises friction linings disposed adjacent said outer circumference of said first cover plate;

said hub disc comprises a plurality of apertures;

said first and second cover plates each comprise a plurality of apertures;

said clutch disc further comprises a plurality of springs disposed in said plurality of apertures of said first and second cover plates and in said plurality of apertures of said hub disc, to provide damped rotational displacement of said hub disc with respect to said first and second cover plates;

each one of said plurality of second portions comprises a substantially rectangular cross-section;

said bearing means is configured for being inserted into said opening from an area adjacent said inner circumference of said first cover plate; and each one of said plurality of guide lugs of said first cover plate having been cut-out from portions of said inner circumference of said first cover plate.

* * * * *

UNITED STATES PATENT AND TRADEMARK OFFICE
CERTIFICATE OF CORRECTION

PATENT NO. : 5,613,589
DATED : March 25, 1997
INVENTOR(S) : Harald JEPPE

It is certified that error appears in the above-indentified patent and that said Letters Patent is hereby corrected as shown below:

On the title page, item [56], under the FOREIGN PATENT DOCUMENTS section, before '3/1954', delete "070626" and insert --0706260--.

In column 4, line 27, after 'further', delete "comprising" and insert --comprises--.

In column 9, line 24, after 'hub', delete "163" and insert --103--.

In column 9, line 36, before 'The', delete "107." and insert --109.--.

In column 12, line 48, Claim 3, after 'claim', delete "1" and insert --2--.

Signed and Sealed this

Eighth Day of July, 1997

*Attest:*

BRUCE LEHMAN

*Attesting Officer*     Commissioner of Patents and Trademarks